(12) United States Patent
Sackman et al.

(10) Patent No.: US 10,243,836 B2
(45) Date of Patent: Mar. 26, 2019

(54) COMMUNICATIONS TRAFFIC OPTIMIZATION AND OBFUSCATION IN DELAY AND DISRUPTION TOLERANT NETWORKS

(71) Applicant: THE BOEING COMPANY, Chicago, IL (US)

(72) Inventors: Ronald Ward Sackman, Mountain View, CA (US); Chrysanthie Diane Chamis, Palos Verdes Peninsula, CA (US)

(73) Assignee: The Boeing Company, Chicago, IL (US)

( * ) Notice: Subject to any disclaimer, the term of this patent is extended or adjusted under 35 U.S.C. 154(b) by 28 days.

(21) Appl. No.: 15/581,279

(22) Filed: Apr. 28, 2017

(65) Prior Publication Data

US 2018/0316601 A1    Nov. 1, 2018

(51) Int. Cl.

| | |
|---|---|
| *H04L 12/729* | (2013.01) |
| *H04L 12/751* | (2013.01) |
| *H04L 12/715* | (2013.01) |
| *H04L 12/851* | (2013.01) |
| *H04L 12/721* | (2013.01) |
| *H04L 12/26* | (2006.01) |
| *H04L 12/24* | (2006.01) |

(Continued)

(52) U.S. Cl.
CPC ........ *H04L 45/125* (2013.01); *H04L 41/0896* (2013.01); *H04L 41/12* (2013.01); *H04L 43/08* (2013.01); *H04L 45/02* (2013.01); *H04L 45/38* (2013.01); *H04L 45/42* (2013.01); *H04L 45/64* (2013.01); *H04L 47/24* (2013.01); *H04L 47/72* (2013.01); *H04L 47/781* (2013.01); *H04L 47/823* (2013.01); *H04L 47/826* (2013.01)

(58) Field of Classification Search
CPC ....... H04L 45/125; H04L 45/64; H04L 45/38; H04L 45/02; H04L 47/24
See application file for complete search history.

(56) References Cited

U.S. PATENT DOCUMENTS

| | | | |
|---|---|---|---|
| 2009/0196170 A1* | 8/2009 | Ayyagari | ................ H04L 45/02 370/221 |
| 2013/0250770 A1* | 9/2013 | Zou | ......................... H04L 47/19 370/238 |
| 2015/0270897 A1 | 9/2015 | Sackman et al. | |

OTHER PUBLICATIONS

Wikipedia; "Delay-tolerant networking," downloaded from <https://en.wikipedia.org/wiki/Delay-tolerant_networking> on Feb. 15, 2017, 5 Pages.

(Continued)

*Primary Examiner* — Dady Chery
(74) *Attorney, Agent, or Firm* — Sage Patent Group

(57) ABSTRACT

A method for communications optimization includes receiving a request, by a network controller, for transmitting communications traffic from a first communications device to a second communications device. The communications traffic includes a particular traffic volume. The method also includes configuring, by the network controller, a plurality of nodes in a communications network using software-defined networking (SDN) to form a single logical switch for transmitting the communications traffic from the first communications device to the second communications device in response to receiving the request for transmitting the communications traffic. The communications network is configured for Delay and Disruption Tolerant Networking (DTN).

20 Claims, 8 Drawing Sheets

(51) Int. Cl.
    *H04L 12/717*  (2013.01)
    *H04L 12/911*  (2013.01)

(56) References Cited

OTHER PUBLICATIONS

Birrane, E., et al.; "Bundle Protocol Security Specification, draft-ietf-dtn-bpsec-04," downloaded from <https://tools.ietf.org/html/draft-ietf-dtn-bpsec-04>, Mar. 12, 2017, 36 Pages.
Burleigh, S.; "Bundle Protocol Extended Class of Service (ECOS), draft-irtf-dtnrg-ecos-05," downloaded from <http://tools.ietf.org/html/draft-irtf-dtnrg-ecos-05>, Jul. 1, 2013, 9 Pages.
Wikipedia; "NETCONF," downloaded from <https://en.wikipedia.org/wiki/NETCONF> on Mar. 17, 2017, 4 Pages.
Wikipedia; "OpenFlow," downloaded from <https://en.wikipedia.org/wiki/OpenFlow> on Mar. 17, 2017, 4 Pages.
Scott, K., et al.; "Bundle Protocol Specification," downloaded from the Internet, Nov. 2007, 50 Pages.
Wikipedia; "Software-defined networking," downloaded from <https://en.wikipedia.org/wiki/Software-defined_networking> on May 2, 2017, 12 Pages.
Wang, Yiwen, et al.; "Multiple bulk data transfers scheduling among datacenters," Computer Networks, 2014, pp. 123-137, vol. 68.
Burleigh, S.; "Contact Graph Routing," Internet Draft, 2010, pp. 1-17; Retrieved from the Internet: <https://tools.ietf.org/pdf/draft-burleigh-dtnrg-cgr-01.pdf.
Wu, Yipeng, et al.; "A Novel DTN Routing Algorithm in the GEO-Relaying Satellite Network," IEEE, 2015 11th International Conference on Mobile Ad-hoc and Sensor Networks (MSN), 2015, pp. 264-269.
European Patent Office; Extended European Search Report for European Patent Application No. 18169534.7 dated Aug. 6, 2018, 14 Pages.

\* cited by examiner

COMMUNICATIONS TRAFFIC OPTIMIZATION AND OBFUSCATION IN DELAY AND DISRUPTION TOLERANT NETWORKS

FIELD

The present disclosure relates to communications networks and more particularly to traffic optimization and obfuscation in delay and disruption tolerant networks.

BACKGROUND

Time-varying wireless networks covering significant distances, such as low and medium earth orbit satellite constellations, deep space/interplanetary networks, airborne networks, and underwater networks present a series of challenges for reliable and secure communications including intermittent connectivity, long and/or variable delay, asymmetric data rates, and high bit error rates. These problems arise due to factors such as orbital movement, atmospheric interference, high latitudes and challenging planetary terrain, and distance between objects in space. For example, the travel time for electromagnetic radiation between Earth and Mars can vary from about 4 minutes to approximately 24 minutes depending on their relative orbital positions. Accordingly, there is a need for a system and method for communications that overcomes these problems.

SUMMARY

In accordance with an embodiment, a method for communications optimization includes receiving a request, by a network controller, for transmitting communications traffic from a first communications device to a second communications device. The communications traffic including a particular traffic volume. The method also includes configuring, by the network controller, a plurality of nodes in a communications network using software-defined networking (SDN) to form a single logical switch for transmitting the communications traffic from the first communications device to the second communications device in response to receiving the request for transmitting the communications traffic. The communications network is configured for Delay and Disruption Tolerant Networking (DTN).

In accordance with another embodiment, a system for communications traffic optimization includes a communications network and a network controller associated with the communications network. The communications network is configured for Delay and Disruption Tolerant Networking (DTN). The network controller is configured to perform a set of functions including receiving a request for transmitting communications traffic from a first communications device to a second communications device. The communications traffic includes a particular traffic volume. The set of functions also includes configuring a plurality of nodes in the communications network using software-defined networking (SDN) to form a single logical switch for transmitting the communications traffic from the first communications device to the second communications device in response to receiving the request for transmitting the communications traffic.

In accordance with a further embodiment, a computer program product for communications traffic optimization includes a computer readable storage medium having program instructions embodied therewith. The computer readable storage medium is not a transitory medium per se and the program instructions are executable by a device to cause the device to perform a method including receiving a request for transmitting communications traffic from a first communications device to a second communications device. The communications traffic includes a particular traffic volume. The method also includes configuring a plurality of nodes in a communications network using software-defined networking (SDN) to form a single logical switch for transmitting the communications traffic from the first communications device to the second communications device in response to receiving the request for transmitting the communications traffic. The communications network is configured for Delay and Disruption Tolerant networking (DTN).

In accordance with another embodiment or any of the previous embodiments, the method or set of functions further includes retrieving a network topology graph and associated attributes from a set of network topology graphs for the communications network in response to receiving the request for transmitting the communications traffic. The network topology graph includes a particular arrangement of nodes that define at least one communications path for transmitting the communications traffic from the first communications device to the second communications device over the communications network. The method or set of functions also includes performing a multicommodity network flow optimization to determine that the at least one communications path corresponding to the network topology graph includes a capacity for transmitting the communications traffic from the first communications device to the second communications device. Configuring the plurality of nodes includes configuring the particular arrangement of nodes for transmitting the communications traffic from the first communications device to the second communications device in response to the at least one communications path including the capacity for transmitting the communications traffic.

In accordance with another embodiment or any of the previous embodiments, the communications network transmits radio frequency (RF) communications between a plurality of communications devices through a time-varying environment. Each network topology graph of the set of network topology graphs includes a different arrangement of nodes that define an associated communications path in the communications network corresponding to different states of the time-varying environment in which the communications network operates.

In accordance with another embodiment or any of the previous embodiments, each node includes a vehicle or a communications device associated with a vehicle. The vehicles are movable relative to one another and a capacity of a communications link between certain nodes is degraded under certain states of the time-varying environment.

In accordance with another embodiment or any of the previous embodiments, performing the multicommodity network flow optimization includes determining that the at least one communications path corresponding to the network topology graph includes the capacity for transmitting the communications traffic from the first communications device to the second communications device with a minimal cost routing and non-splittable multicommodity flows.

In accordance with another embodiment or any of the previous embodiments, performing the multicommodity network flow optimization includes performing linear programming to solve a binary decision matrix for the communications traffic to use the at least one communications path. The binary decision matrix converges to a particular solution in response to each link of a plurality of links of the at least one communications path including a capacity for transmitting the communications traffic.

In accordance with another embodiment or any of the previous embodiments, the method or system further includes determining whether a total capacity of the at least one communications path exceeds the particular traffic volume of the communications traffic and performing the linear programming to solve for the binary decision matrix in response to the total capacity of the at least one communications path exceeding the particular traffic volume of the communications traffic.

In accordance with another embodiment or any of the previous embodiments, the method or system additionally includes determining a lowest priority flow of the communications traffic in response to the particular traffic volume exceeding the total capacity of the at least one communications path. The communications traffic includes a plurality of flows and each flow has a predetermined priority. The lowest priority flow is assigned to a next network topology graph of the set of network topology graphs in response to the particular traffic volume exceeding the total capacity of the at least one communications path.

In accordance with another embodiment or any of the previous embodiments, the method or system also includes determining a lowest priority flow of the communications traffic in response to the binary decision matrix not converging to the particular solution and assigning the lowest priority flow to the next network topology graph of the set of network topology graphs in response to the binary decision matrix not converging to the particular solution.

In accordance with another embodiment or any of the previous embodiments, the method or system further includes determining that a time reservation for transmitting the communications traffic has expired and extending a time interval through a next network topology graph to complete transmitting the communications traffic in response to the time reservation having expired.

In accordance with another embodiment or any of the previous embodiments, the method or system further includes determining an amount of excess capacity on each link of the plurality of links of the at least one communications path and determining an amount of excess capacity on each link of the next network topology graph in response to the time interval being extended through the next network topology graph. Obfuscation traffic is injected within the communications traffic to obfuscate mission traffic contained in the communications traffic based on the amount of excess capacity.

In accordance with another embodiment or any of the previous embodiments, the method or system additionally includes confirming that a time reservation for transmitting the communications traffic is less than a predefined maximum value before configuring the particular arrangement of nodes for transmitting the communications traffic. The method or system also includes transmitting a request denied notice to the first communications device in response to the time reservation exceeding the predefined maximum value. The request denied notice includes notification that the request for transmitting the communications traffic is denied. The request denied notice also includes proposed acceptable parameters for a new request for transmitting the communications traffic in a next network topology graph or a subsequent network topology graph. The proposed acceptable parameters include a proposed bandwidth and a proposed time reservation. The method or system also includes transmitting a request granted notice to the first communications device in response to the time reservation being less than the predefined maximum value. The request granted notice includes a notification that the request for transmitting the communications traffic has been granted. The request granted notice also includes a final reservation time for the first communications device to start transmitting the communications traffic. The final reservation time corresponds to a requested reservation time in the request or a new reservation time.

In accordance with another embodiment or any of the previous embodiments, the system further includes a network topology database associated with the network controller. The network topology database includes the set of network topology graphs and associated attributes. The network topology database also includes a bandwidth reservation associated with each request for transmitting communications traffic between at least two communications devices in response to one or more requests being received. The network topology database also includes a stored flow for each link of each network topology graph.

The features, functions, and advantages that have been discussed can be achieved independently in various embodiments or may be combined in yet other embodiments further details of which can be seen with reference to the following description and drawings.

DETAILED DESCRIPTION

Figure 1A:
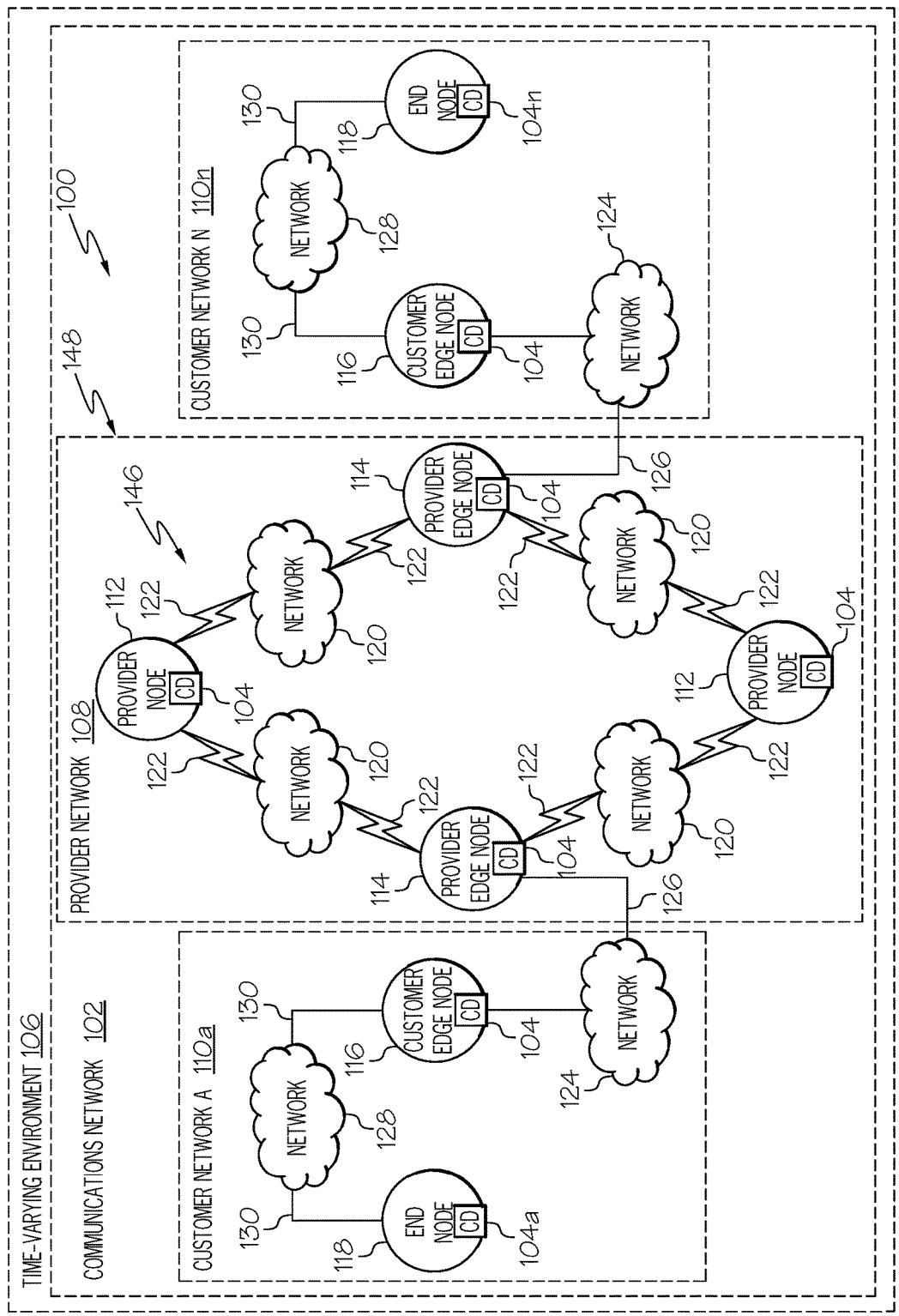
FIG. 1A is a schematic diagram of an example of a Delay and Disruption Tolerant Networking (DTN) network in accordance with an embodiment of the present disclosure.

The following detailed description of embodiments refers to the accompanying drawings, which illustrate specific embodiments of the disclosure. Other embodiments having different structures and operations do not depart from the scope of the present disclosure. Like reference numerals may refer to the same element or component in the different drawings.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

In accordance with an embodiment, two technologies, Delay and Disruption Tolerant Networking (DTN) and Software-Defined Networking (SDN), hold significant promise to overcome the challenges associated with time-varying environments, such as satellite networks, deep space/interplanetary networks, and other environments with time-varying connectivity. DTN addresses communications in dynamic connectivity environments by introducing store-and-forward message switching to routing nodes. Internet routers use random access memory (RAM) to buffer incoming packets for a few milliseconds while awaiting a forwarding table lookup and an available outgoing router interface. By contrast, DTN routers implement persistent storage so they can queue messages in networks lacking static, immediately available end-to-end communications paths. This may involve storage for seconds, minutes, hours, or even longer. With regard to taxonomy, DTN routing protocols fall into two categories: forwarding-based protocols and replication-based protocols. Forwarding-based protocols transmit a message one time only via a single path, whereas replication-based protocols can copy a message and transmit it multiple times via multiple paths. Forwarding-based protocols make better use of available network resources, while replication-based protocols can improve the message delivery ratio. In accordance with an embodiment, the exemplary systems and methods described herein use forwarding-based DTN routing protocols.

The majority of DTN routing protocols are non-optimal, due to the inherent complexity of DTN. SDN provides a complementary mechanism to optimize forwarding in a DTN environment, as SDN assumes the existence of a central controller with a priori knowledge of the network topologies. SDN has emerged in recent years as a disruptive network technology. The central concept of SDN is to decouple the control plane from the data forwarding plane, assigning control plane functions to a central controller with authority over a domain of network devices. SDN controllers typically communicate with network devices using one or more standards-based protocols such as OpenFlow and/or Network Configuration Protocol (NETCONF), and present a northbound application programming interface (API) to external applications. This architecture lends itself well to rapid re-provisioning and optimization of network resources based on anticipated changes to the physical network topology. OpenFlow is a trademark of the Open Networking Foundation (ONF) in the United States, other countries or both. ONF manages the OpenFlow standard. NETCONF is a trademark of the Internet Engineering Task Force (IETF) in the United States, other countries or both.

As described herein, traffic obfuscation includes modifying a communications traffic profile of a network to disguise the footprint of actual mission communications traffic. The exemplary methods and systems of the present disclosure influence observable traffic characteristics in a deterministic fashion. The exemplary methods and systems described herein combine DTN and SDN concepts for communications traffic optimization and obfuscation in DTN environments.

FIG. 1A is a schematic diagram of an example of a DTN 100 in accordance with an embodiment of the present disclosure. The DTN 100 defines a communications network 102 or combination of communications networks that are configured for Delay and Disruption Tolerant Networking. The DTN 100 is configured for communications between communications devices 104 in a time-varying environment 106. The exemplary DTN 100 includes a provider network 108 communicatively connected to a plurality of customer networks 110a-110n. The provider network 108 includes a plurality of provider nodes 112 and provider edge nodes 114. Each customer network 110a-110n includes at least one customer edge node 116 and at least one end node 118. The provider nodes 112 are communicatively connected to the provider edge nodes 114 by a wireless or radio frequency (RF) network 120 or networks including a plurality of communications links 122. One or more communications links 122 are configured for transmitting communications traffic between a particular provider node 112 and particular provider edge node 114.

A provider edge node 114 is communicatively connected to a customer edge node by a first wireline network 124 including a plurality of communications links 126. The customer edge node 116 is communicatively connected to the customer end node 118 by a second wireline network 128 including a plurality of communications links 130. One or more communications links 126 of the first network 124 are configured for transmitting communications traffic between a particular provider edge node 114 and a particular customer edge node 116. One or more communications links 130 of the second wireline network 128 are configured for transmitting communications traffic between a particular customer edge node 116 and a particular customer end node 118. The nodes 112, 114, 116 and 118 each include a communications device 104 for transmitting and receiving communications traffic.

Figure 1B:
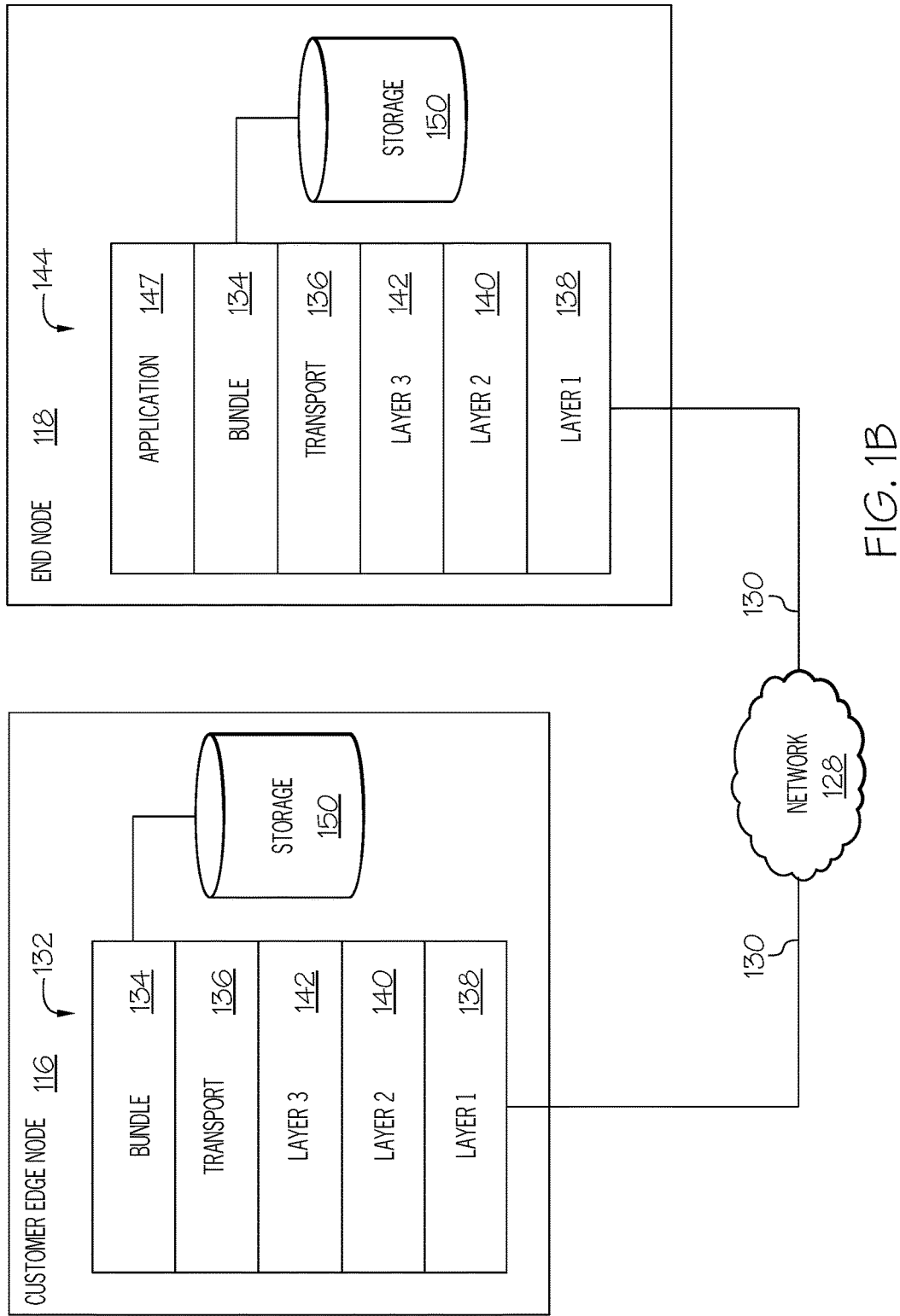
FIG. 1B is a schematic diagram of an example of a customer edge node and a customer end node in accordance with an embodiment of the present disclosure.

Referring also to FIG. 1B, FIG. 1B is a schematic diagram of an example of a customer edge node 116 and a customer end node 118 in accordance with an embodiment of the present disclosure. In accordance with an embodiment, the customer edge node 116 includes a protocol stack 132 that includes a bundle protocol layer 134, a transport protocol layer 136, and protocol layers 1-3 138-142. The end node 118 includes a protocol stack 144 that includes an application layer 147 in addition to a bundle protocol layer 134, a transport protocol layer 136, and protocol layers 1-3 138-142. As previously described, the customer edge node 116 communicates with the end node 118 via the network 128 which includes a plurality of links 130 or communications paths within the network 128. The provider node 112 and provider edge nodes 114 each include a similar architecture and protocol stack 132 as the customer edge node 116. The provider nodes 112 and provider edge nodes 114 are also referred to herein as routing nodes 146 and define a set of switches.

The DTN 100 presents a general DTN connectivity case in which each node 112-118 connects to its adjacent node(s) 112-118 via networks 120, 124 and 128 with multiple possible communications paths. Using SDN, the provider network 108 set of switches and/or routing nodes 146 can be made to appear as a "single logical switch" 148 for connecting customer networks 110a and 110n or a first communications device 104a in the first customer network 110a and a second communications device 104n in the second customer network 110n. Customer networks 110a and 110n or first and second communications devices 104a and 104n can connect to this single logical switch 148 at layer 2 140 or at layer 3 142 of an associated customer edge node 116. In the example shown in FIG. 1A, the single logical switch 148 includes a plurality of DTN routing nodes 146 or provider edge nodes 114 and provider nodes 112 that connect to each other via wireless links 122 with time-varying connectivity and link parameters. Examples of link parameters include but is not necessarily limited to capacity or amount of bandwidth a particular link 122 can carry or support; round trip delay, latency and packet loss. As previously described, time-varying connectivity may be due environmental conditions including orbital movement of the routing nodes 146, atmospheric interference, high latitudes, challenging planetary terrain, distance between objects in space or other conditions that affect connectivity under certain conditions or circumstances. In accordance with an embodiment, the bundle protocol 134 defined by Internet Engineering Task Force (IETF) Request for Comments (RFC) 5050 could be used. Other forwarding-based DTN routing protocols could also be used.

In the Internet, Transmission Control Protocol (TCP) provides end-to-end communications reliability by retransmitting any segment that is not acknowledged by the destination. In the DTN 100, the bundle protocol 134 can leverage lower layer protocols to ensure communications reliability on a hop-by-hop basis, with the bundle protocol 134 itself optionally ensuring end-to-end communications. Examples of the bundle protocol 134 include but is not necessarily limited to a bundle protocol with end-to-end acknowledgment over User Datagram Protocol (UDP) transport layer or a bundle protocol with end-to-end acknowledgment over Licklider Transmission Protocol (LTP) as specified in RFC 5326 by the Networking Working Group of IETF.

Each of the provider nodes 112 and 114 and customer nodes 116 and 118 include a storage device 150 for storing communications traffic or messages using a forwarding-based protocol until an appropriate communications path is available using the routing nodes 146 as described in more detail herein. In accordance with an embodiment, the storage device 150 of each provide edge node 114 includes non-volatile storage and is expected to run the bundle protocol 134. The storage device 150 of each provider node 112 also includes non-volatile storage and layer 5-7 functionality but may use one of several methods to store network flows. A network flow, communications flow, or simply a flow is defined herein as a sequence of packets of data for transmission or that is being transmitted from a source communications device to a destination communications device. One or more network flows transmitted between a source communications device and a destination communications device are also referred to herein as communications traffic. Examples of methods for storing network flows or communications traffic include but is not necessarily limited to writing flows to a packet capture file then replaying that file when a forwarding link comes available; looping communications traffic back to the node itself until a forwarding link comes available; and the bundle protocol.

In accordance with an embodiment, communications traffic from an end customer node 118 is encrypted using a protocol such as BPsec as described in draft-ietf-dtn-bpsec-03 by the IETF. Additionally, bundle flows in the network 102 can be afforded different treatment in the network 102 by using a mechanism such as Bundle Protocol Extended Class of Service (ECOS) as described in draft-irtf-dtnrg-ecos-05 by the IETF.

Figure 2:
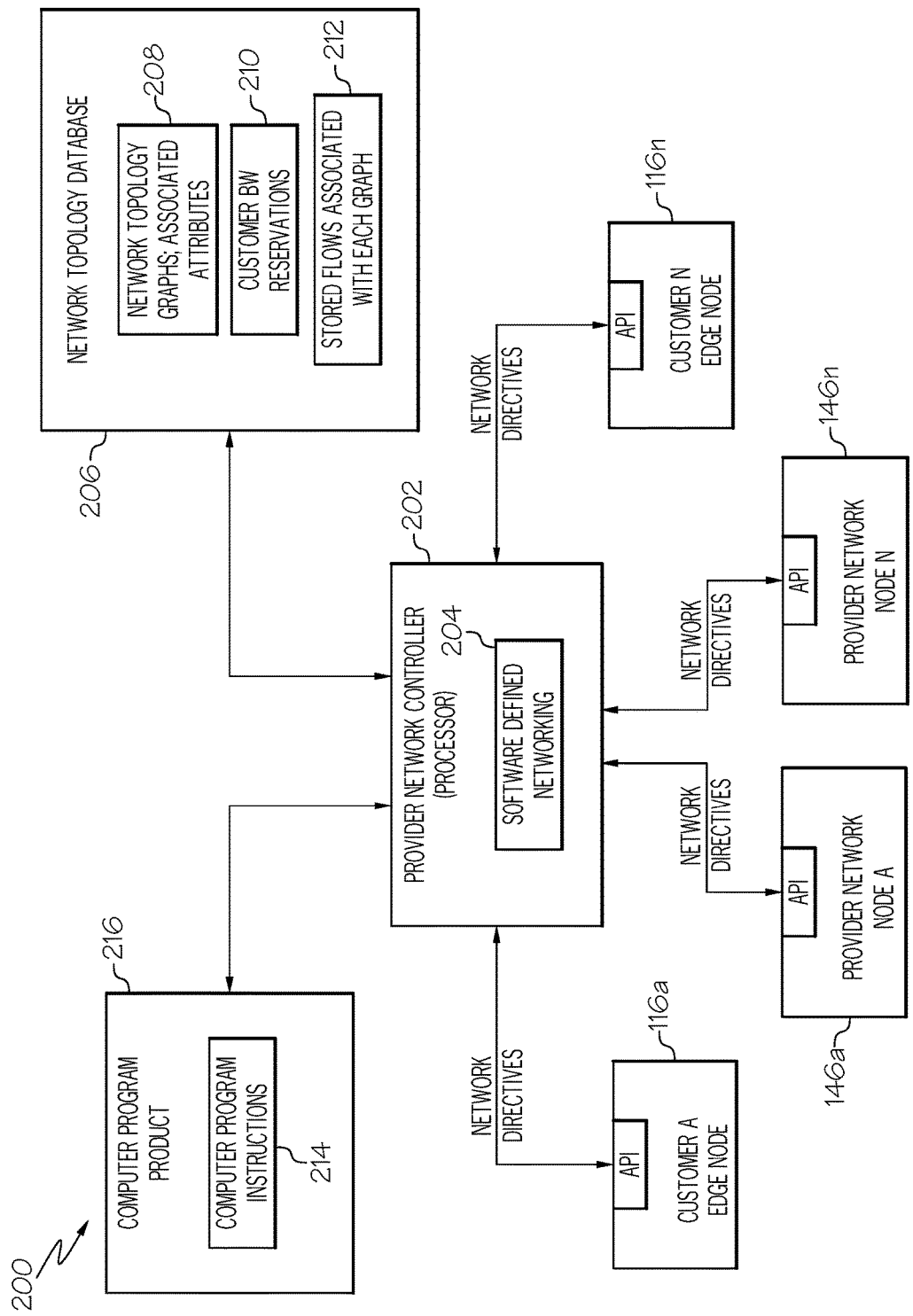
FIG. 2 is a block schematic diagram of an example of a network controller hierarchy in accordance with an embodiment of the present disclosure.

FIG. 2 is a block schematic diagram of an example of a network controller hierarchy 200 in accordance with an embodiment of the present disclosure. The network controller hierarchy 200 includes a provider network controller 202 or simply network controller. In accordance with an embodiment, the provider network controller 202 is embodied in a processor or data processing device and is component within the provider network 108 (FIG. 1A). In another embodiment the provider network controller 202 is a separate component from the provider network 108. A Software-Defined Networking (SDN) 204 functionality is embodied on the provider network controller 202 and performed by the provider network provider 202 as described herein. The SDN 204 is configured to perform the operations described in more detail with reference to FIGS. 4-6.

The provider network controller 202 interacts with network nodes 146a-146n under its span of control using southbound network protocols such as OpenFlow and/or Network Configuration Protocol (NETCONF). In accordance with an embodiment, the provider network controller 202 also has administrative control over the customer edge nodes 116a-116n. In accordance with another embodiment, each customer network 110a-110n has a similar controller and node architecture within their own network. The customer edge nodes 116a-116n are capable of sourcing and terminating flows in the communications network 102. This will provide a capability for traffic obfuscation as described in more detail herein. Customer edge node 116a may also be referred to herein as a first communications device 104a and customer edge node 116n may also be referred to herein a second communications device 104n. In accordance with an embodiment as previously described, the provider network controller 202 communicates with network devices or nodes 116a-116n and 146a-146n using the standards-based protocols, OpenFlow and/or NETCONF, and presents a northbound application programming interface (API) to external applications.

A network topology database 206 is also associated with the provider network controller 202. The network topology database 206 stores a plurality or set of network topology graphs 208 and associated attributes for the communications network 102 or DTN 100. The network topology database 206 also stores customer bandwidth reservations 210 including reservation times as described in more detail herein and also stores flows 212 associated with each network topology graph 208. As described in more detail below, each network topology graph 208 includes a different arrangement of nodes that define an associated communications path in the DTN 100 corresponding to different states of the time-varying environment 106 in which the DTN 100 operates.

In accordance with an embodiment, the SDN 204 is embodied as computer program instructions 214 on a computer program product 216. The computer program product 216 may be the same as that previously described. The SDN is loaded on the provider network controller 202 from the computer program product 216 by any suitable interface.

Figure 3:
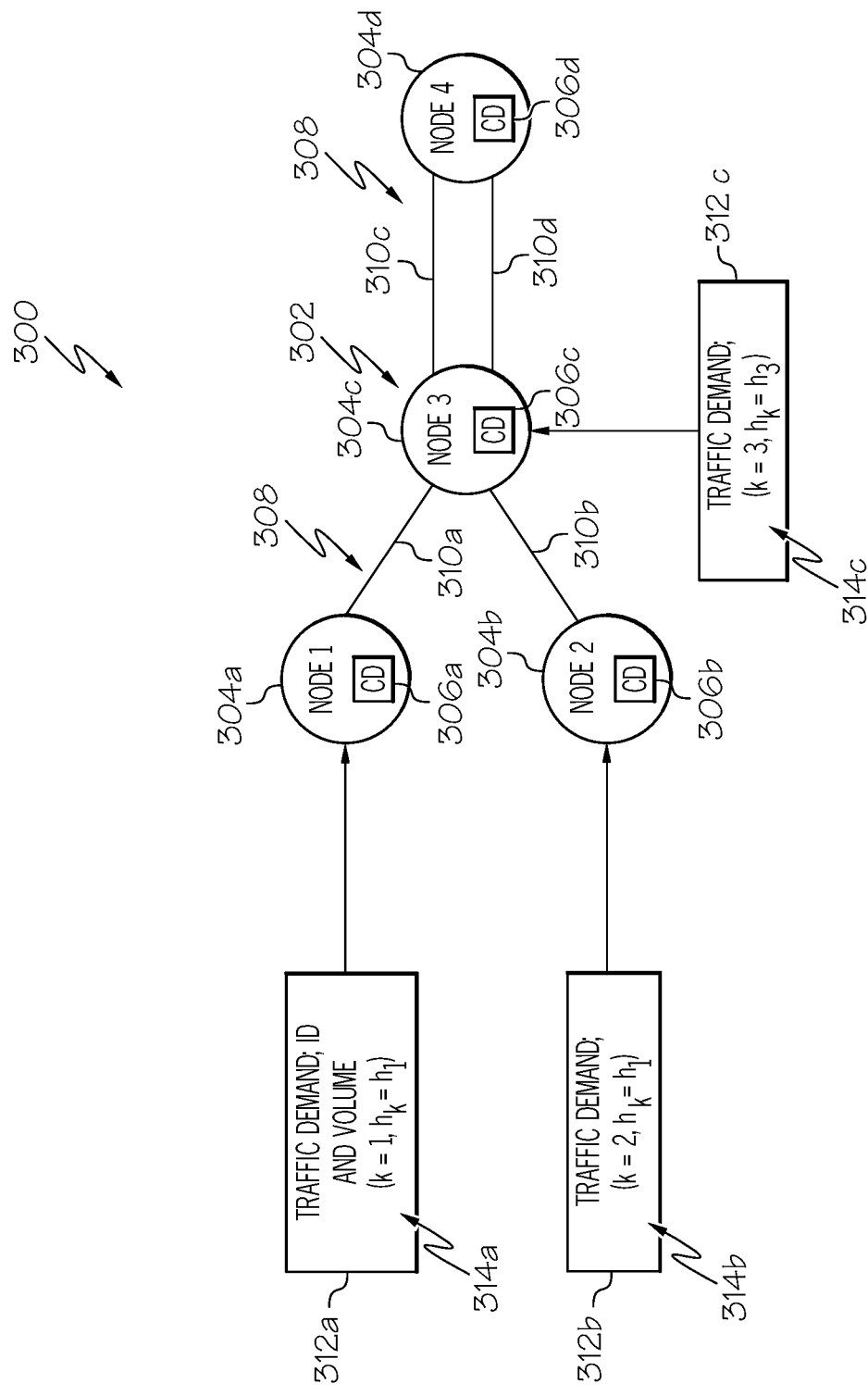
FIG. 3 is an illustration of an example of a network topology graph in accordance with an embodiment of the present disclosure.

In certain cases, such as a single link 122 between two relays or nodes 146a, 146n orbiting Earth and Mars, the general topology depicted in FIG. 1A simplifies to a single connection between two nodes that is either on, off, or degraded. FIG. 3 shows an example of a simplified DTN topology. This simplified topology will be used to describe an example of traffic optimization and obfuscation in a DTN environment, such as DTN 100 in FIG. 1A. FIG. 3 is an illustration of an example of a network topology graph 300 in accordance with an embodiment of the present disclosure. The exemplary network topology graph 300 includes a particular arrangement 302 of nodes 304a-304d. Each of the nodes 304a-304d is also considered to be a communications device 306a-306d or includes a communications device 306a-306d. Each of the nodes 304a-304d corresponds to either a customer edge node 116 or a routing node 146. For example, nodes 304a, 304b and 304d may correspond to customer edge nodes 116 FIGS. in 1A, 1B and 2 while node 304c may correspond to a routing node 146 in FIGS. 1A, 1B and 2. In accordance with an embodiment, each node 304 or at least some nodes 304 include a vehicle. The vehicles are movable relative to one another and a capacity of a communications link 310a-310d between certain nodes 304 are degraded under certain states of the time-varying environment 106. Examples of the vehicle include a spacecraft, aircraft, land vehicles, or watercraft, such as a ship or submarine.

The particular arrangement 302 of nodes 304a-304d defines at least one communications path 308 from a first communications device 306a or node 304a to a second communications device 306d or node 304d over the communications network 102 or DTN 100 (FIG. 1). The particular arrangement 302 of nodes 304a-304d includes communications links 310a-310d between adjacent nodes 304a-304d. The links 310a-310d correspond to the links 122 and 126 in FIG. 1A.

Each link 310a-310d includes a particular link identification and capacity. The capacity of a particular link 310a-310d is a bandwidth or volume of communications traffic that the particular link 310a-310d can transmit. The bandwidth or volume is measured in kilobits per second (Bps), Megabits per second or Gigabits per second depending upon the specific communications media. Accordingly, each communications path 308 is capable of transmitting communications traffic 312a-312c having a particular traffic demand 314a-314c or traffic volume. Each traffic demand 314a-314c is identified by a unique identification (ID) and includes the particular traffic volume.

In accordance with at least one embodiment, the exemplary network topology graph 300 may be characterized by the following assumptions:

1. The links 310 shown in FIG. 3 are well-behaved, i.e. they are available and/or degraded/unavailable on a predictable basis. The exemplary network topology graph 300 can be considered a backbone that connects DTN edge networks which may be far less predictable.
2. The network topology graph 300 may include both provider nodes 112 and 114 and customer edge nodes 116.
3. The provider network controller 202 (FIG. 2) has control over all nodes 304 in FIG. 3. However, in other embodiments, the methodology described herein could also be applied to and generate benefit in systems in which the provider network controller 202 has control over only a subset of nodes. In the latter case possible approaches include:
   a. Treating the uncontrolled nodes as background traffic sources.
   b. Inserting a controlled node upstream from an uncontrolled node.
4. All the communications links 310 in the network topology graph 300 are wireless, either radio frequency or free space optical for moving terrestrial, air, and space nodes or acoustic for moving underwater nodes. The exemplary embodiments described herein are applicable to multiple DTN environments including medium earth orbit (MEO) and low earth orbit (LEO) satellites, swarms of unmanned aerial vehicles (UAVs), manned and/or unmanned underwater vehicles (UUVs), and tactical networks, such as communications networks for military, first responders or the like.
5. Nodes 304a-304d can be vehicles (e.g. satellites) that move relative to each other, potentially causing changes in capacity, latency, jitter, and packet loss for each link.
6. Nodes 304a-304d may lose contact with each other completely (e.g. due to orbital movement). When this occurs the capacity of the link or links 310a-310d between the affected nodes 304a-304d goes to zero.
7. The network topology graph 300 represents the maximum number of links 310a-310d available in the particular topology graph. These links 310a-310d either operate at full capacity, degraded capacity, or zero capacity (e.g. due to orbital movement behind a planet).
8. A traffic engineering mechanism exists that can assign a minimum bandwidth reservation $j_{resv}$ (j subscript resv) and time reservation $t_{resv}$ (t subscript resv) to support flows for a given customer or communications device. Given the low number of customer flows in this DTN environment, assume $j_{resv} \sim h_k$ (h subscript k), i.e., assume that the bandwidth reservation for a given customer or communications device is approximately equal to the offered DTN load for that customer.
9. A traffic prioritization mechanism such as Bundle Protocol ECOS exists such that customer flows can be prioritized relative to each other, even when encrypted.
10. The provider network controller 202 leverages the network topology database 206 that maintains state for network graph topology, link parameters, and stored DTN flows at any given interval.
11. Multicommodity traffic, i.e. traffic from various sources to various destinations, exists in the DTN network 100.
12. DTN flows are non-splittable, i.e. all packets associated with a given unidirectional flow follow the same communications path.

Given these assumption, the problem formulation for minimal cost routing with non-splittable multicommodity flows is as follows:

Minimize the Routing Cost Function (Equation 1):

$$F = \sum_{k=1}^{K} \sum_{p=1}^{P} \xi_{kp} h_k u_{kp} \quad \text{Equation 1}$$

Subject to the following constraints Equation 2 and Equation 3:

$$\sum_{p=1}^{P} u_{kp} = 1 \quad \text{Equation 2}$$

$$\sum_{k=1}^{K} \sum_{p=1}^{P_k} \delta_{kpl} h_k u_{kp} < y_l \ l = 1 \ldots L \quad \text{Equation 3}$$

Table 1 details the notation used in this formulation:

TABLE 1

| Notation Given: | Explanation |
|---|---|
| k = 1 ... K | Traffic demand identifier |
| $h_k$ | Volume of traffic for demand k |
| l = 1 ... L | Network link |
| $y_l$ | Capacity of link l (variable) |
| $c_l$ | Capacity of link l (fixed) |
| p = 1 ... P | Path identifier (end-to-end, relative to a given source & destination) |
| $\delta_{kpl}$ | Link path indicator |
| | $\begin{cases} = 1 \text{ if path p for demand k uses link l} \\ = 0 \text{ if path p for demand k does not use link l} \end{cases}$ |
| $\xi_{kp}$ | Unit cost of flow k on path p |
| $j_{resv}$ | Customer bandwidth reservation |
| $t_{resv}$ | Customer time reservation |
| Variable: | |
| $u_{kp}$ | Binary decision matrix for flow k to choose path p |

Equation 1 states that each non-splittable flow will follow one and only one path from source to destination. Equation 3 states that the sum of flows on each link must be less than the capacity of that link. Applying this formulation to the exemplary network topology in FIG. 3 with K=3, L=2, and P=2, the objective function expands as follows:

$$F = \sum_{k=1}^{3} \sum_{p=1}^{2} \xi_{kp} h_k u_{kp}$$

$$F = (\xi_{11} h_1 u_{11} + \xi_{12} h_1 u_{12}) + (\xi_{21} h_2 u_{21} + \xi_{22} h_2 u_{22}) + (\xi_{31} h_3 u_{31} + \xi_{32} h_3 u_{32})$$

The non-splittable flow equality constraint expands as follows:

$$\sum_{p=1}^{2} u_{kp} = 1 \ k = 1..3$$

$$\begin{cases} u_{11} + u_{12} = 1 \\ u_{21} + u_{22} = 1 \\ u_{31} + u_{32} = 1 \end{cases}$$

The link capacity inequality constraint expands as follows:

$$\sum_{k=1}^{3} \sum_{p=1}^{2} \delta_{kpl} h_k u_{kp} < y_l \ l = 1, 2$$

-continued $$(\delta_{111}h_1u_{11} + \delta_{121}h_1u_{12}) +$$
$$(\delta_{211}h_2u_{21} + \delta_{221}h_2u_{22}) + (\delta_{311}h_3u_{31} + \delta_{321}h_3u_{32}) < y_1$$
$$(\delta_{112}h_1u_{11} + \delta_{122}h_1u_{12}) + (\delta_{212}h_2u_{21} + \delta_{222}h_2u_{22}) +$$
$$(\delta_{312}h_3u_{31} + \delta_{322}h_3u_{32}) < y_2$$

Recall that each source or nodes 304a, 304b and 304c in FIG. 3 has two possible paths to the destination, node 304d. The term $\delta_{kpl}$ goes to zero when $p \neq l$ (e.g. path 1 has no presence on link 2), so the capacity inequality constraints simplify to:

$$(\delta_{111}h_1u_{11}) + (\delta_{211}h_2u_{21}) = (\delta_{311}h_3u_{31}) \leq y_1$$
$$(\delta_{122}h_1u_{12}) + (\delta_{222}h_2u_{22}) + (\delta_{322}h_3u_{32}) \leq y_2$$

The link capacity $y_l$ can vary from its maximum value $y_{max}$ through a range of fixed values $c_l$ down to $y_l=0$. Degradation $y_{max} > y_l > 0$ might be caused by changing bit error rates on a wireless link e.g. due to atmospheric or space conditions. $y_l=0$ occurs when a network node is unreachable, for example due to orbital motion. So flow optimization for this example DTN network 300 could be solved as follows:
1. Fix values for $y_1=c_1$ and $y_2=c_2$. This corresponds to a specific state of the DTN network topology, either current or future.
2. If the total traffic volume $h_1+h_2+h_3 > c_1+c_2$, identify the lowest priority flow and store it to be sent at a future DTN topology state.
3. Use a linear programming tool, such as Gusek, to solve the expanded set of equations above for $u_{kp}$.
4. If the solution $u_{kp}$ does not converge, assume that for the current traffic volumes there is no solution that does not exceed either link 1 capacity $c_1$ or link 2 capacity $c_2$. Identify the lowest priority flow and store it to be sent at a future DTN topology state.
5. Iterate the above steps until $u_{kp}$ is solved.

Figure 4:
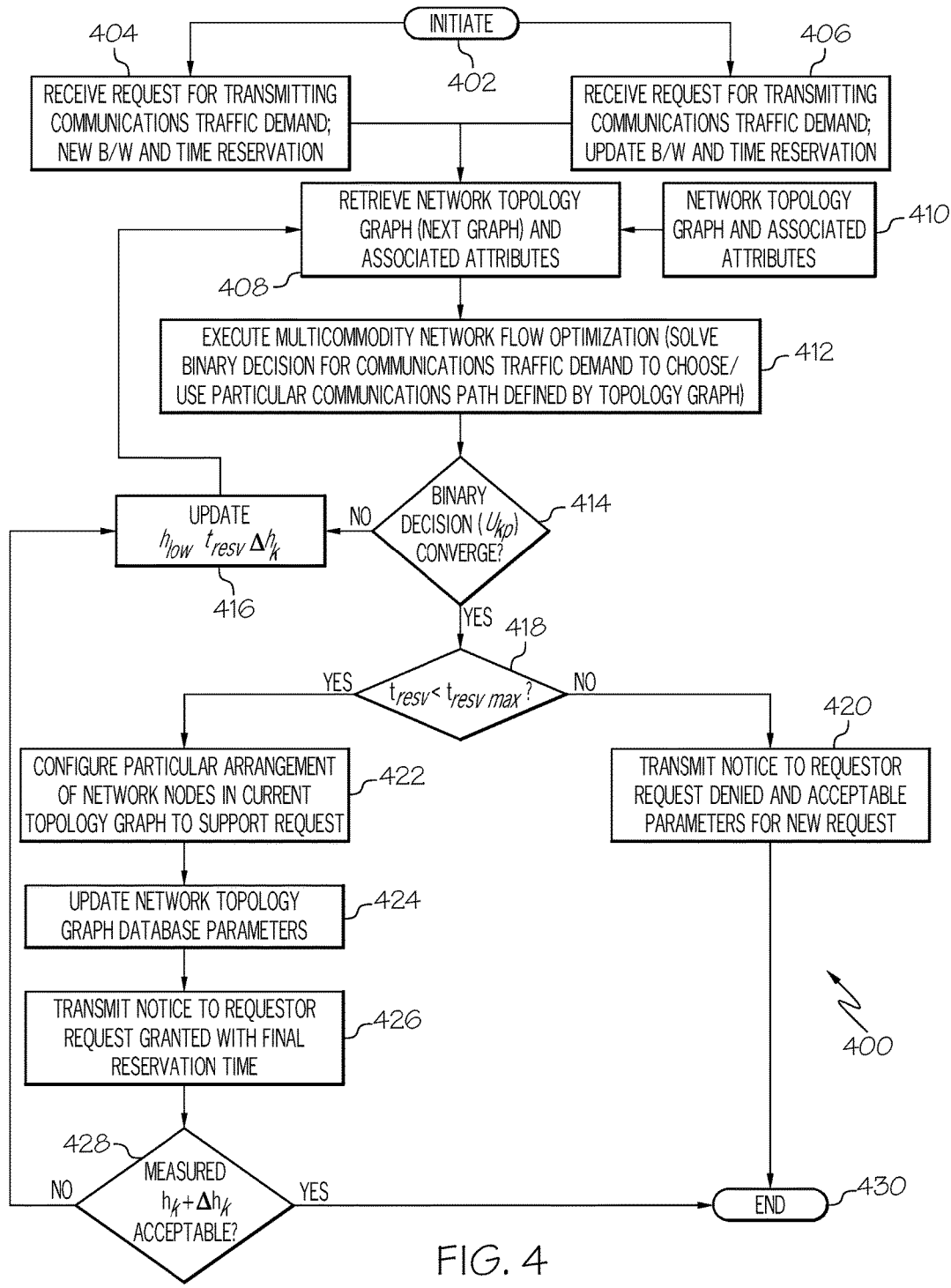
FIG. 4 is a flowchart of an example of a method for optimization of traffic flow in a DTN network in accordance with an embodiment of the present disclosure.

This approach is generalized for DTN environments, such as exemplary DTN network 100 in FIG. 1 with arbitrary numbers of nodes and links in FIG. 4. FIG. 4 is a flowchart of an example of a method 400 for optimization of traffic flow in a DTN network in accordance with an embodiment of the present disclosure. In accordance with an embodiment, the method 400 is embodied in and performed by the provider network controller 202 in FIG. 2.

The method 400 is initiated in block 402. In block 404 or block 406, the provider network controller 202 receives a request for transmitting communications traffic from a first communications device or customer for transmitting the communications traffic from the first communications device to a second communications device. The communications traffic in the request includes a particular traffic volume. In block 404, the request for transmitting the communications traffic is a request including a new bandwidth and a new time reservation for the transmitting the communications traffic from the first communications device to the second communications device. In block 406, the request includes an updated bandwidth and an updated time reservation relative to an earlier request for transmitting the communications traffic. As described herein, if a first or earlier request for transmitting the communications traffic is unable to be performed for any of the reasons described, the customer or first communications device is provided updated parameters for submitting a new request. The updated parameters include at least an updated bandwidth and an updated time reservation based on the communications traffic the customer or first communications device intends to transmit to the second communications device over the DTN network 100.

In block 408, the network controller retrieves a network topology graph 410 and associated attributes from a set of network topology graphs for the communications network or DTN network in response to receiving the request for transmitting the communications traffic. The network topology graph 410 includes a particular arrangement of nodes that define at least one communications path for transmitting the communications traffic from the first communications device to the second communications device over the communications network or DTN.

In the exemplary embodiment in FIG. 2, the provider network controller 202 retrieves the network topology graph 410 from the set of network topology graphs 208 stored in the network topology database 206. The network topology database 206 maintains a set of network topology graphs 208 that each correspond to a known different state (e.g. due to changing orbital positions) of the DTN environment or time-varying environment 106. Each network topology graph 208 has an associated set of attributes. The set of attributes includes but is not necessarily limited to a link topology, link parameters including capacity, round trip delay, latency, and packet loss, etc., list and size of stored DTN flows 212, and customer reservation bandwidths and time durations 210.

Accordingly, transmitting the communications traffic demand from the first communications device to the second communications device includes transmitting the communications traffic demand through a time-varying environment, such as time-varying environment 106. The communications network 102 includes a DTN network, such as DTN network 100. Each network topology graph 208 includes a different arrangement of nodes 304 that define an associated communications path 308 in the DTN network 100 corresponding to different states of the time-varying environment 106 in which the DTN network 100 operates.

In block 412, the network controller performs a multicommodity network flow optimization to determine that the at least one communications path corresponding to the network topology graph 410 includes a capacity for transmitting the communications traffic from the first communications device to the second communications device. Performing the multicommodity network flow optimization includes performing linear programming to solve a binary decision matrix ($u_{kp}$ (u subscript kp)) for the communications traffic or flow (k) to choose or use a particular communications path (p) defined by the network topology graph 410. An example of performing a multicommodity network flow optimization is described in more detail with reference to FIG. 5. Performing the multicommodity network flow optimization includes determining that the at least one communications path corresponding to the network topology graph 410 includes the capacity for transmitting the communications traffic demand from the first communications device to the second communications device with a minimal cost routing and non-splittable multicommodity flows.

In block 414, a determination is made whether the binary decision matrix ($u_{kp}$) for the communications traffic of flow to choose or use the particular communications path defined by the network topology graph 410 has converged to a solution in the multicommodity network flow optimization. The binary decision matrix converges to a particular solution in response to each link of a plurality of links of the particular communications path defined by the network topology graph 410 including a capacity for transmitting the communications traffic associated with the request. If the binary decision matrix does not converge, the method 400 advances to block 416. In block 416, tuning parameters for use with a next network topology graph are determined. In accordance with an embodiment, the tuning parameters include a lowest priority flow ($h_{low}$ (h subscript low)) within the communications traffic associated with the request and a new time reservation ($t_{resv}$ (t subscript resv)) for transmitting the communications traffic using the next network topology graph. In accordance with an embodiment, the tuning parameters also include determining additional traffic volume or flows ($\Delta h_k$ ($\Delta h$ subscript k)) that can be injected into a communications path associated with the next network topology graph without exceeding the capacity of any of the links of the communications path. The tuning parameters are updated and returned to block 408 for use with the next network topology graph. The method 400 may then continue as previously described. The next network topology graph is retrieved in block 404 and a new multicommodity network flow optimization will be executed in block 412 using the next network topology graph with the tuning parameters from block 416.

If the binary decision matrix converges in block 414, the method 400 advances to block 418. In block 418, a confirmation is made or determined whether a time reservation ($t_{resv}$ (t subscript resv)) for transmitting the communications traffic is less than a predefined maximum value or maximum reservation time ($t_{resv\ max}$ (t subscript resv max)) to ensure that a particular time reservation in a request does not reside in the system for an impractical period of time. If the time reservation for transmitting the communications traffic has exceeded the predefined maximum value in block 416, the method 400 advances to block 420. In block 420, a request denied notice is transmitted to the first communications device or requestor that submitted the request in block 404 or block 406 in response to the time reservation exceeding the predefined maximum value. The request denied notice includes notification that the request for transmitting the communications traffic is denied and also includes proposed acceptable parameters for a new request for transmitting the communications traffic using the next network topology graph or a subsequent network topology graph. The proposed acceptable parameters include at least a proposed bandwidth and a proposed time reservation for the new request.

If the confirmation in block 416 is that the time reservation for transmitting the communications traffic is less than the predefined maximum value, the method 400 advances to block 422. In block 422, the network controller configures the particular arrangement of nodes in the current network topology graph to support the request for transmitting the communications traffic from the first communications device to the second communications device in response to the at least one communications path including the capacity for transmitting the communications traffic. The network controller configures the relevant network nodes to support the bandwidth and time reservation in the request for transmitting the communications traffic with minimal cost routing and non-splittable multicommodity flows as determined by convergence of the binary decision matrix during execution of the multicommodity network flow optimization.

In block 424, the network topology graph database is updated with the parameters associated with the configuration of the particular arrangement of nodes associated with the current network topology graph. The parameters include at least a volume of traffic on each link between the configured nodes for transmitting the communications traffic from the first communications device to the second communications device. In accordance with an embodiment, as described in more detail with respect to FIG. 6, by determining an amount of excess capacity on each link ($\Delta h_k$) between the configured nodes, a volume of flow of obfuscation traffic can be injected within the communications traffic to obfuscate mission traffic contained in the communications traffic. The volume ($\Delta h_k$) of the obfuscation traffic is calculated based on an amount of excess capacity on a particular link in the communications path.

In block 426, a request granted notice is transmitted to the first communications device or requestor that submitted the request in block 404 or block 406 in response to the time reservation being less than the predefined maximum value in block 418. The request granted notice includes at least a notification that the request for transmitting the communications traffic has been granted. In accordance with an embodiment, the notice also includes a final reservation time for the first communications device to start transmitting the communications traffic. The final reservation time corresponds to either the requested reservation time in the request or a new reservation time in the event the requested reservation time has expired or would expire prior to completely transmitting the communications traffic, or for some other reason the requested reservation time cannot be used to start transmitting the communications traffic in the request.

In block 428, an overall traffic flow ($h_k + \Delta h_k$) is measured at multiple network nodes to confirm that the optimized flows have been correctly implemented. Additionally, measured traffic may be compared against an objective obfuscation traffic profile as described in more detail herein. If the overall traffic flow isn't acceptable, the method 400 returns to block 416 and updates tuning parameters for use with the next network topology graph similar to that previously described. If the overall traffic flow is acceptable, the method ends at block 430.

Figure 5A:
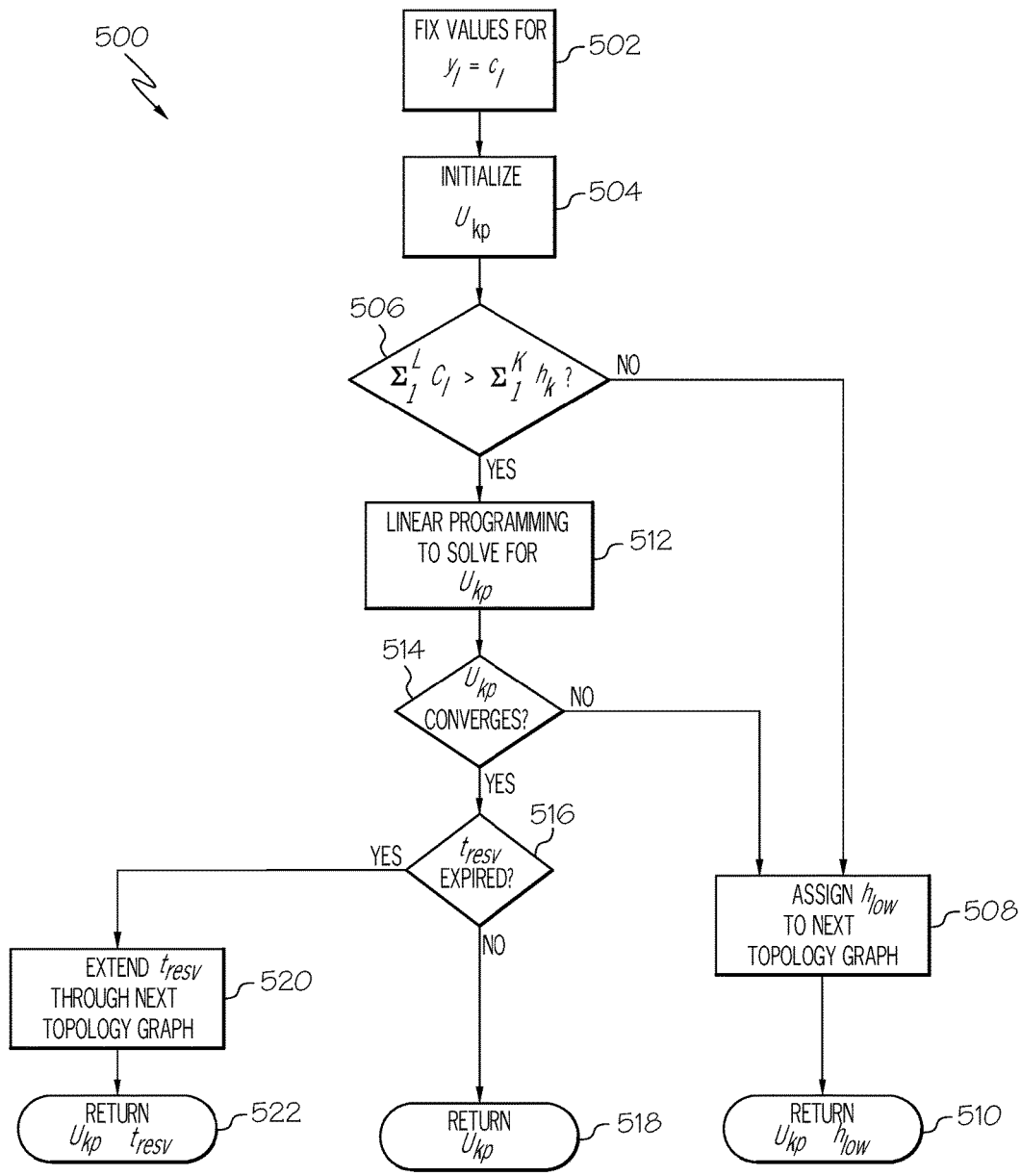
FIG. 5A is a flowchart of an example of a method for multicommodity network flow optimization in accordance with an embodiment of the present disclosure.

FIG. 5A is a flowchart of an example of a method 500 for multicommodity network flow optimization in accordance with an embodiment of the present disclosure. In accordance with an embodiment, the method 500 is embodied in the block 412 in FIG. 4. In block 502, a variable capacity value ($y_l$ (y subscript l)) for each link (l) is set to a corresponding fixed capacity value ($c_l$ (c subscript l) for each link in the at least one communications path of the current network topology graph. In block 504, the binary decision matrix ($u_{kp}$) for the communications traffic or flow (k) to choose or use the particular communications path (p) defined by the current network topology graph is initialized to a known set of values.

In block 506, a determination is made whether a total capacity of the at least one communications path exceeds the total volume of the offered communications traffic. If the particular traffic volume of the communications traffic in the request exceeds the total capacity of the at least one communications path, the method 500 advances to block 508. In block 508, a lowest priority flow $h_{low}$ (h subscript low) of the communications traffic is determined in response to the particular traffic volume exceeding the total capacity of the at least one communications path. The communications traffic may include a plurality of flows and each flow includes a predetermined priority. As previously described, a traffic prioritization mechanism, such as Bundle Protocol ECOS may be used to prioritize the plurality of flows within the communications traffic relative to one another. The lowest priority flow $h_{low}$ is identified and assigned to be transmitted in the next network topology graph. In block 510, the binary decision matrix $u_{kp}$ and lowest priority flow $h_{low}$ are returned to block 412 in FIG. 4.

If the total capacity of the at least one communications path exceeds the particular traffic volume of the communications traffic in block 506, the method 500 advances to block 512. In block 512, linear programming is performed to solve the binary decision matrix $u_{kp}$ for the communications traffic (k) to use the at least one communications path (p) of the current network topology graph. The binary decision matrix $u_{kp}$ converges to a particular solution based on the linear programming determining that each link of a plurality of links of the at least one communications path includes a capacity for transmitting the communications traffic.

In block 514, a determination is made whether the binary decision matrix $u_{kp}$ converges to the particular solution. If the binary decision matrix $u_{kp}$ does not converges to the particular solution that each link of the at least one communications path includes a capacity for transmitting the communications traffic, the method 500 advances to block 508 and the lowest priority flow $h_{low}$ is identified and assigned to be transmitted in the next network topology graph as previously described.

If the determination is made that the binary decision matrix $u_{kp}$ converges to the particular solution in block 514, the method 500 advances to block 516. In block 516, a determination is made whether a time reservation $t_{resv}$ (t subscript resv) for transmitting the communications traffic in the current network topology graph has expired because of a change in the state of the time-varying environment 106 (FIG. 1). If the time reservation $t_{resv}$ has not expired, the binary decision matrix $u_{kp}$ is returned to block 412 in FIG. 4 in block 518.

If the determination in block 516 is that the time reservation $t_{resv}$ has expired for the current network topology graph, the method 500 advances to block 520. In block 520, the time reservation $t_{resv}$ is extended a certain time interval through the next network topology graph to complete transmitting the communications traffic. The binary decision matrix $u_{kp}$ and time reservation $t_{resv}$ or extended time interval of time reservation $t_{resv}$ are returned to block 412 in FIG. 4 in block 522. The network controller will extend the time interval through the next network topology graph.

Figure 5B:
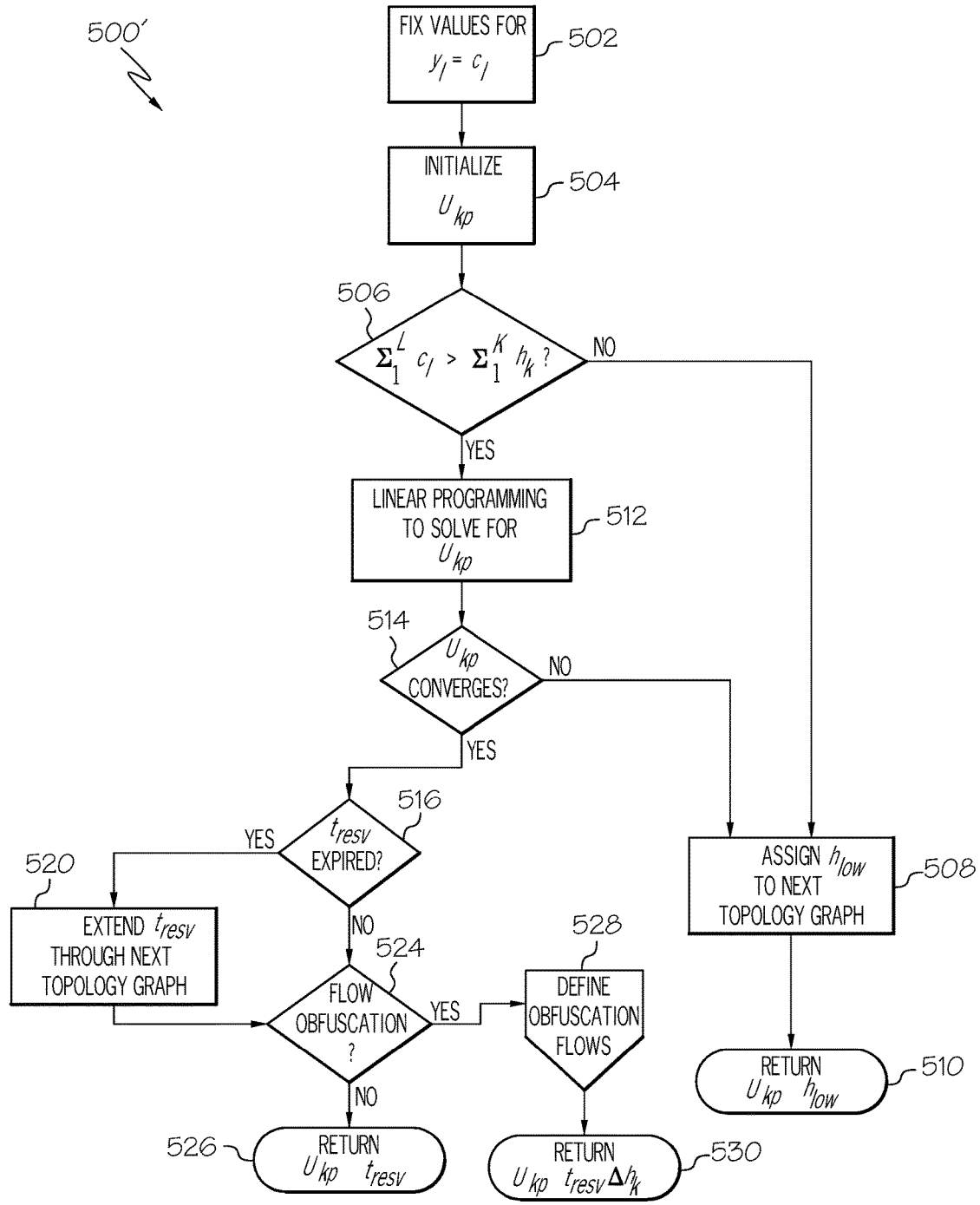
FIG. 5B is a flowchart of an example of a method for multicommodity network flow optimization and obfuscation in accordance with another embodiment of the present disclosure.

FIG. 5B is a flowchart of an example of a method 500' for multicommodity network flow optimization and obfuscation in accordance with another embodiment of the present disclosure. The method 500' is similar to the method 500 in FIG. 5A except the method 500' includes the feature of providing traffic obfuscation to modify the traffic profile of the communications network 102 or DTN network 100 to disguise a footprint of actual mission traffic in the communications traffic. The provider network controller 202 has knowledge of existing bandwidth reservations from customers or communications devices associated with customers or users, the duration of the bandwidth reservation, and stored flows associated with each network topology graph. Accordingly, the provider network controller 202 can identify links and times where available capacity will exist with respect to each network topology graph 208 and when each graph will be in use based on different states of the time-varying environment 106. Additionally, because the nodes 116, 146 or associated communications devices of the DTN network 100 can source and/or terminate network flows under the direction of the provider network controller 202, the provider network controller 202 is configured to intelligently inject obfuscation traffic into the communications traffic or flows for the purpose of obfuscating actual mission traffic.

In the exemplary method 500', after block 516 or block 520, the method 500 advances to block 524. In block 524, the provider network controller 202 determines whether or not to inject obfuscation or superfluous communications traffic into the communications flows based on an objective traffic profile to obfuscate mission traffic in the DTN network 100. The decision to inject obfuscation traffic may be based on input from a customer or user or based on guidance or preset rules or conditions within the provider network 108 itself. If there is a determination not to inject obfuscation traffic in block 524, the binary decision matrix $u_{kp}$ and time reservation $t_{resv}$ or extended time interval of time reservation $t_{resv}$ are returned to block 412 in FIG. 4 in block 526.

If there is a determination in block 524 to injection obfuscation traffic in block 524, the method 500' advances to block 528 and obfuscation flows are defined. An exemplary method for defining obfuscation flows will be described with reference to FIG. 6. The obfuscation flow process returns a set of additional flows or excess flow capacity $\Delta h_k$ associated with each link of the particular communications path associated with the current network topology graph. Obfuscation traffic may be injected within the communications traffic to obfuscate mission traffic contained in the communications traffic based on the amount of excess flow capacity. The binary decision matrix $u_{kp}$, time reservation $t_{resv}$ and excess flow capacity $\Delta h_k$ associated with each link are returned to block 412 in FIG. 4 in block 530.

Figure 6:
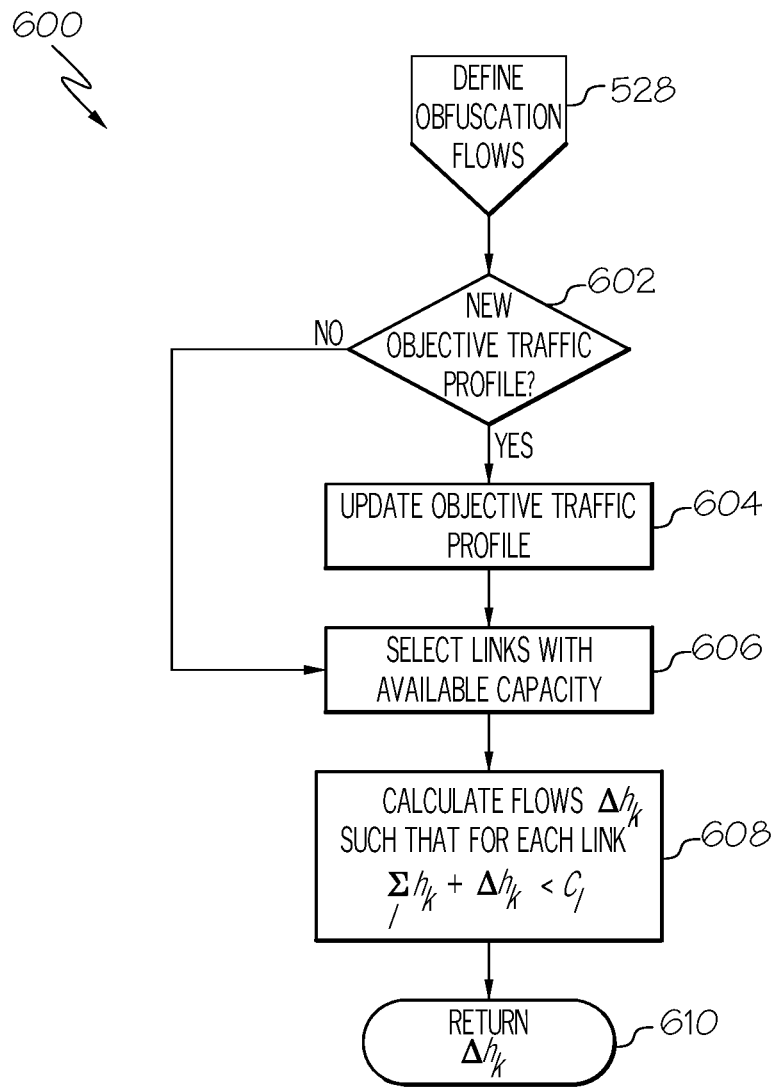
FIG. 6 is a flowchart of an example of a method for communications traffic obfuscation in accordance with an embodiment of the present disclosure.

FIG. 6 is a flowchart of an example of a method 600 for communications traffic obfuscation in accordance with an embodiment of the present disclosure. In block 602, the provider network controller 202 determines whether the user has submitted a new objective traffic profile. If the user has submitted a new objective traffic profile, the new objective traffic profile is updated in block 604. After updating the objective traffic profile in block 604 or if a new traffic profile has not been submitted in block 602, the method 600 advances to block 606. In block 606, links are selected that have available or excess capacity. In block 608, an amount of excess capacity on each link of the plurality of links of the at least one communications path associated with the current network topology graph is determined. An amount of excess capacity on each link of the next network topology graph is determined in response to the time interval being extended through the next network topology map. Additional flows based on the excess capacity of each link capacity $\Delta h_k$ are determined that can be injected into the DTN network without exceeding the capacity of any links. At block 610, the set of values for the excess capacity flow capacity $\Delta h_k$ associated with each link is returned to block 528 or the calling algorithm and incorporated into the next network topology graph for injecting obfuscation traffic within the communications traffic to obfuscate mission traffic contained in the communications traffic based on the amount of excess capacity of each link. The provider network controller 202 interacts with customer premise equipment under its control to initiate the actual obfuscating flows, nominally via an application programming interface. This approach could be used to, for example, maintain an approximately constant network traffic profile over time regardless of changes to mission traffic.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to embodiments in the form disclosed. Many modifications and variations will be apparent to those of ordinary skill in the art without departing from the scope and spirit of embodiments.

Although specific embodiments have been illustrated and described herein, those of ordinary skill in the art appreciate that any arrangement which is calculated to achieve the same purpose may be substituted for the specific embodiments shown and that the embodiments have other applications in other environments. This application is intended to cover any adaptations or variations. The following claims are in no way intended to limit the scope of embodiments of the disclosure to the specific embodiments described herein.

What is claimed is:

1. A method for communications optimization, comprising:
   receiving a request, by a network controller, for transmitting communications traffic from a first communications device to a second communications device, the communications traffic comprising a particular traffic volume;
   configuring, by the network controller, a plurality of nodes in a communications network using software-defined networking (SDN) to form a single logical switch for transmitting the communications traffic from the first communications device to the second communications device in response to receiving the request for transmitting the communications traffic, wherein the communications network is configured for Delay and Disruption Tolerant Networking (DTN); and
   retrieving a network topology graph and associated attributes from a set of network topology graphs for the communications network in response to receiving the request for transmitting the communications traffic, the network topology graph comprising a particular arrangement of nodes that define at least one communications path for transmitting the communications traffic from the first communications device to the second communications device over the communications network through a time-varying environment.

2. The method of claim 1, further comprising:
   performing a multicommodity network flow optimization to determine that the at least one communications path corresponding to the network topology graph comprises a capacity for transmitting the communications traffic from the first communications device to the second communications device; and
   wherein configuring the plurality of nodes comprises configuring the particular arrangement of nodes for transmitting the communications traffic from the first communications device to the second communications device in response to the at least one communications path including the capacity for transmitting the communications traffic.

3. The method of claim 2, wherein transmitting the communications traffic from the first communications device to the second communications device comprises transmitting the communications traffic through the time-varying environment, and wherein each network topology graph comprises a different arrangement of nodes that define an associated communications path in the communications network corresponding to different states of the time-varying environment in which the communications network operates.

4. The method of claim 3, wherein each node of the plurality of nodes comprises a vehicle, the vehicles being movable relative to one another and a capacity of a communications link between certain nodes being degraded under certain states of the time-varying environment.

5. The method of claim 2, wherein performing the multicommodity network flow optimization comprises determining that the at least one communications path corresponding to the network topology graph comprises the capacity for transmitting the communications traffic from the first communications device to the second communications device with a minimal cost routing and non-splittable multicommodity flows.

6. The method of claim 2, wherein performing the multicommodity network flow optimization comprises performing linear programming to solve a binary decision matrix for the communications traffic to use the at least one communications path, wherein the binary decision matrix converges to a particular solution in response to each link of a plurality of links of the at least one communications path including a capacity for transmitting the communications traffic.

7. The method of claim 6, further comprising:
   determining whether a total capacity of the at least one communications path exceeds the particular traffic volume of the communications traffic;
   performing the linear programming to solve for the binary decision matrix in response to the total capacity of the at least one communications path exceeding the particular traffic volume of the communications traffic;
   determining a lowest priority flow of the communications traffic in response to the particular traffic volume exceeding the total capacity of the at least one communications path, the communications traffic comprising a plurality of flows, each flow comprising a predetermined priority; and
   assigning the lowest priority flow to a next network topology graph of the set of network topology graphs in response to the particular traffic volume exceeding the total capacity of the at least one communications path.

8. The method of claim 6, further comprising:
determining a lowest priority flow of the communications traffic in response to the binary decision matrix not converging to the particular solution, the communications traffic comprising a plurality of flows, each flow comprising a predetermined priority; and
assigning the lowest priority flow to a next network topology graph of the set of network topology graphs in response to the binary decision matrix not converging to the particular solution.

9. The method of claim 6, further comprising:
determining that a time reservation for transmitting the communications traffic has expired; and
extending a time interval through a next network topology graph to complete transmitting the communications traffic in response to the time reservation having expired.

10. The method of claim 9, further comprising:
determining an amount of excess capacity on each link of the plurality of links of the at least one communications path;
determining an amount of excess capacity on each link of the next network topology graph in response to the time interval being extended through the next network topology graph; and
injecting obfuscation traffic within the communications traffic to obfuscate mission traffic contained in the communications traffic based on the amount of excess capacity on each link of the plurality of links and based on the amount of excess capacity on each link of the next network topology graph.

11. The method of claim 2, further comprising:
confirming that a time reservation for transmitting the communications traffic is less than a predefined maximum value before configuring the particular arrangement of nodes for transmitting the communications traffic; and
transmitting a request denied notice to the first communications device in response to the time reservation exceeding the predefined maximum value, the request denied notice comprising:
notification that the request for transmitting the communications traffic is denied; and
proposed acceptable parameters for a new request for transmitting the communications traffic in a next network topology graph or a subsequent network topology graph, the proposed acceptable parameters comprising a proposed bandwidth and a proposed time reservation;
transmitting a request granted notice to the first communications device in response to the time reservation being less than the predefined maximum value, the request granted notice comprising:
a notification that the request for transmitting the communications traffic has been granted; and
a final reservation time for the first communications device to start transmitting the communications traffic, wherein the final reservation time corresponds to a requested reservation time in the request or a new reservation time.

12. A system for communications traffic optimization, comprising:
a communications network, the communications network being configured for Delay and Disruption Tolerant Networking (DTN); and
a network controller associated with the communications network, the network controller being configured to perform a set of functions comprising:
receiving a request for transmitting communications traffic from a first communications device to a second communications device, the communications traffic comprising a particular traffic volume;
configuring a plurality of nodes in the communications network using software-defined networking (SDN) to form a single logical switch for transmitting the communications traffic from the first communications device to the second communications device in response to receiving the request for transmitting the communications traffic; and
retrieving a network topology graph and associated attributes from a set of network topology graphs for the communications network in response to receiving the request for transmitting the communications traffic, the network topology graph comprising a particular arrangement of nodes that define at least one communications path for transmitting the communications traffic from the first communications device to the second communications device over the communications network through a time-varying environment.

13. The system of claim 12, wherein the set of functions further comprises:
performing a multicommodity network flow optimization to determine that the at least one communications path corresponding to the network topology graph comprises a capacity for transmitting the communications traffic from the first communications device to the second communications device; and
wherein configuring the plurality of nodes comprises configuring the particular arrangement of nodes for transmitting the communications traffic from the first communications device to the second communications device in response to the at least one communications path including the capacity for transmitting the communications traffic.

14. The system of claim 13, further comprising a network topology database associated with the network controller, wherein the network topology database comprises:
the set of network topology graphs and associated attributes;
a bandwidth reservation associated with each request for transmitting communications traffic between at least two communications devices in response to one or more requests being received; and
a stored flow for each link of each network topology graph.

15. The system of claim 14, wherein the communications network transmits radio frequency (RF) communications between a plurality of communications devices through the time-varying environment, each network topology graph of the set of network topology graphs comprises a different arrangement of nodes that define an associated communications path in the communications network corresponding to different states of the time-varying environment in which the communications network operates.

16. The system of claim 13, wherein performing the multicommodity network flow optimization comprises determining that the at least one communications path corresponding to the network topology graph comprises the capacity for transmitting the communications traffic from the first communications device to the second communications device with a minimal cost routing and non-splittable multicommodity flows.

17. The system of claim 16, wherein the set of functions further comprises:
   determining that a time reservation for transmitting the communications traffic has expired; and
   extending a time interval through a next network topology graph to complete transmitting the communications traffic in response to the time reservation having expired.

18. The system of claim 17, wherein the set of functions further comprises:
   determining an amount of excess capacity on each link of the plurality of links of the at least one communications path; and
   injecting obfuscation traffic within the communications traffic to obfuscate mission traffic contained in the communications traffic based on the amount of excess capacity.

19. A computer program product for communications traffic optimization, the computer program product comprising a computer readable storage medium having program instructions embodied therewith, wherein the computer readable storage medium is not a transitory medium per se, the program instructions being executable by a device to cause the device to perform a method comprising:
   receiving a request for transmitting communications traffic from a first communications device to a second communications device, the communications traffic comprising a particular traffic volume;
   configuring a plurality of nodes in a communications network using software-defined networking (SDN) to form a single logical switch for transmitting the communications traffic from the first communications device to the second communications device in response to receiving the request for transmitting the communications traffic, wherein the communications network is configured for Delay and Disruption Tolerant Networking (DTN); and
   retrieving a network topology graph and associated attributes from a set of network topology graphs for the communications network in response to receiving the request for transmitting the communications traffic, the network topology graph comprising a particular arrangement of nodes that define at least one communications path for transmitting the communications traffic from the first communications device to the second communications device over the communications network through a time-varying environment.

20. The computer program product of claim 19, wherein the method further comprises:
   performing a multicommodity network flow optimization to determine that the at least one communications path corresponding to the network topology graph comprises a capacity for transmitting the communications traffic from the first communications device to the second communications device; and
   wherein configuring the plurality of nodes comprises configuring the particular arrangement of nodes for transmitting the communications traffic from the first communications device to the second communications device in response to the at least one communications path including the capacity for transmitting the communications traffic.

* * * * *